(12) United States Patent
Engber et al.

(10) Patent No.: US 6,399,680 B1
(45) Date of Patent: *Jun. 4, 2002

(54) ACID-REACTED POLYMER-MODIFIED ASPHALT COMPOSITIONS AND PREPARATION THEREOF

(75) Inventors: Steven L. Engber, Onalaska; Gerald H. Reinke, La Crosse, both of WI (US)

(73) Assignee: Mathy Construction Company, Onalaska, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/644,032

(22) Filed: Aug. 22, 2000

Related U.S. Application Data

(63) Continuation of application No. 08/862,333, filed on May 23, 1997, now Pat. No. 6,117,926, which is a continuation of application No. 08/402,705, filed on Mar. 13, 1995, now abandoned.

(51) Int. Cl.$^7$ ............................. C08L 95/00; C08L 63/00
(52) U.S. Cl. .......................... 524/59; 524/62; 524/69; 525/54.5
(58) Field of Search ................... 524/62, 69, 58; 525/54.5

(56) References Cited

U.S. PATENT DOCUMENTS

| | | | |
|---|---|---|---|
| 2,956,034 A | 10/1960 | Simpson | 260/18 |
| 3,202,621 A | 8/1965 | Street | 260/18 |
| 3,876,439 A | 4/1975 | Schneider | 106/287 |
| 3,915,730 A | 10/1975 | Lehureau | 106/279 |
| 4,070,532 A | 1/1978 | Hammer | 526/11.2 |
| 4,157,428 A | 6/1979 | Hammer | 521/134 |
| 4,238,241 A | 12/1980 | Schneider | 106/281 |
| 4,331,481 A | 5/1982 | Schneider | 106/283 |
| 4,368,228 A | 1/1983 | Gorgati | 428/110 |
| 5,070,123 A | 12/1991 | Moran | 524/69 |
| 5,095,055 A * | 3/1992 | Moran | 524/59 |
| 5,288,392 A | 2/1994 | Santos | 208/13 |
| 5,306,750 A * | 4/1994 | Goodrich | 524/59 |
| 5,331,028 A * | 7/1994 | Goodrich | 524/68 |
| 5,367,003 A | 11/1994 | Petcavich | 525/231 |
| 5,576,363 A | 11/1996 | Gallagher | 524/62 |
| 5,882,373 A | 3/1999 | Moran | 524/68 |
| 6,011,095 A | 1/2000 | Planche et al. | 524/68 |
| 6,020,404 A | 1/2000 | Planche et al. | 524/59 |
| 6,136,898 A * | 10/2000 | Loza et al. | 524/69 |

FOREIGN PATENT DOCUMENTS

DE    2 255 173    11/1972

OTHER PUBLICATIONS

Lee et al., "Handbook of Epoxy Resins", McGraw–Hill Book Co., p. 10–11 (Reissue 1982).*

Handbook of Epoxy Resins, Henry Lee and Kris Neville, McGraw Hill Book Co., pp. 1–2; pp. 10–11; Chapter 15 pp. 15–1 thru 15–28; Chapter 22, pp. 22–1 thru 22–71; and Chapter 23, pp. 23–1 through 23–25 (1982 Reissue).

* cited by examiner

Primary Examiner—D. R. Wilson
(74) Attorney, Agent, or Firm—Faegre & Benson LLP

(57) ABSTRACT

An acid-reacted polymer-modified asphalt composition comprising (1) at least about 80 weight percent, based upon the composition, of an asphalt; (ii) about 0.2 to about 15 weight percent, based upon the composition, of a polymer containing available epoxy groups; and (iii) an amount of an acid effective for promoting chemical bonding between the asphalt and the polymer, wherein the composition exhibits substantially improved Dynamic Shear Rheometer stiffness values without an appreciable loss in the G" viscous component of complex modulus, and low temperature creep stiffness and "m" values.

42 Claims, 7 Drawing Sheets fig. 1

SHRP BINDER SPECIFICATIONS

| Performance Grade | | PG 52 | | | | | PG 58 | | | | | | PG 64 | | | | |
|---|---|---|---|---|---|---|---|---|---|---|---|---|---|---|---|---|---|
| Ave. 7 days Max Pave Temp., C | | <PG 52 | | | | | <PG 58 | | | | | | <PG 64 | | | | |
| Min Pavement Service Temp., C | | -10 | -16 | -22 | -28 | -34 | -16 | -22 | -28 | -34 | -40 | -46 | -10 | -16 | -22 | -28 | -34 | -40 |
| | | >-10 | >-16 | >-22 | >-28 | >-34 | >-16 | >-22 | >-28 | >-34 | >-40 | >-46 | >-10 | >-16 | >-22 | >-28 | >-34 | >-40 |
| TEST CONDITIONS | SPEC | TEST TEMPERATURE (DEGREES C) | | | | | | | | | | | | | | | | |
| | | TESTS ON ORIGINAL BINDER | | | | | | | | | | | | | | | | |
| Flash Point Temp. ASTM D 92 | 230 C, min | | | | | | 230 | | | | | | | | | | | |
| Brookfield Viscosity, ASTM D 4402, 135 C** | 3 Pa-sec.max 3000 cP | | | | | | 135 | | | | | | | | | | | |
| Dynamic Shear, SHRP B-003: 0°/sin delta @ 10 rad/sec (1/T") | 1.0 kPa min | | | 52 | | | | | 58 | | | | | | 64 | | | |
| Physical Hardening Index, h*** | | | | | | | report | | | | | | | | | | | |
| | | TESTS ON RTFO (AASHTO T 240; ASTM D 2872) RESIDUE: | | | | | | | | | | | | | | | | |
| Mass loss, % | 1.00 max | | | | | | | | | | | | | | | | | |
| Dynamic Shear, SHRP B-003: 0°/sin delta @ 10 rad/sec (1/T") | 2.2 kPa min | | | 52 | | | | | 58 | | | | | | 64 | | | |
| | | TESTS ON PAV (AFTER RTFO) (SHRP B-005) RESIDUE: | | | | | | | | | | | | | | | | |
| PAV Aging Temperature | | 90 | | | | | 100 | | | | | | 100 | | | | | |
| Dynamic Shear, SHRP B-003: 0°/sin delta @ 10 rad/sec (0°) | 5000 kPa max | 25 | 22 | 19 | 16 | 13 | 10 | 25 | 22 | 19 | 16 | 13 | 10 | 31 | 28 | 25 | 22 | 19 | 16 |
| Bending Beam Creep Stiffness: SHRP B-002.; S, 60 s; m at 60 s *** | s=300,000 kPa max; m=0.300 min | 0 | -6 | -12 | -18 | -24 | -30 | -36 | -6 | -12 | -18 | -24 | -30 | -36 | 0 | -6 | -12 | -18 | -24 | -30 |
| Direct Tension (SHRP B-006): Failure Strain, 1.0 mm/min, % **** | 1.0% min | 0 | -6 | -12 | -18 | -24 | -30 | -36 | -6 | -12 | -18 | -24 | -30 | -36 | 0 | -6 | -12 | -18 | -24 | -30 |

SHRP BINDER SPECIFICATIONS

*Fig. 2*

| Performance Grade | | PG 70 | | | | | | | PG 76 | | | | | | | PG 82 | | | | | | |
|---|---|---|---|---|---|---|---|---|---|---|---|---|---|---|---|---|---|---|---|---|---|---|
| Ave. 7 days Max Pave Temp., C | | <PG 70 | | | | | | | <PG 76 | | | | | | | <PG 82 | | | | | | |
| Min Pavement Service Temp., C | | -10 | -16 | -22 | -28 | -34 | -40 | | -10 | -16 | -22 | -28 | -34 | -40 | | -10 | -16 | -22 | -28 | -34 | -40 | |
| | | >-10 | >-16 | >-22 | >-28 | >-34 | >-40 | | >-10 | >-16 | >-22 | >-28 | >-34 | >-40 | | >-10 | >-16 | >-22 | >-28 | >-34 | >-40 | |
| TEST CONDITIONS | SPEC | TEST TEMPERATURE (DEGREES C) | | | | | | | | | | | | | | | | | | | | |
| | | TESTS ON ORIGINAL BINDER | | | | | | | | | | | | | | | | | | | | |
| Flash Point Temp, ASTM D 92 | 230 C, min | | | | | | | | 230 | | | | | | | | | | | | | |
| Brookfield Viscocity, ASTM D 4402, 135 C ** | 3 Pa-sec. max 3000 cSt | | | | | | | | 135 | | | | | | | | | | | | | |
| Dynamic Shear, SHRP B-003: 0°/sin delta @ 10 rad/sec (1/s) | 1.0 kPa min | 70 | | | | | | | 76 | | | | | | | 82 | | | | | | |
| Physical Hardening Index, h*** | | | | | | | | | | | | | | | | | | | | | | |
| | | TESTS ON RTFO (AASHTO T 240; ASTM D 2872) RESIDUE: | | | | | | | | | | | | | | | | | | | | |
| Mass loss, % | 1.00 max | | | | | | | | | | | | | | | | | | | | | |
| Dynamic Shear, SHRP B-003: 0°/sin delta @ 10 rad/sec (1/s) | 2.2 kPa min | 70 | | | | | | | 76 | | | | | | | 82 | | | | | | |
| | | TESTS ON PAV (AFTER RTFO) (SHRP B-005) RESIDUE: | | | | | | | | | | | | | | | | | | | | |
| PAV Aging Temperature | | 100/(110)*** | | | | | | | 100/(110)*** | | | | | | | 100/(110)*** | | | | | | |
| Dynamic Shear, SHRP B-003: 0°xsin delta @ 10 rad/sec (0°) | 5000 kPa max | 34 | 31 | 28 | 25 | 22 | 19 | | 37 | 34 | 31 | 28 | 25 | 22 | | 40 | 37 | 34 | 31 | 28 | 25 | |
| Bending Beam Creep Stiffness: SHRP B-002, 8, 60 s; m at 60 s *** | G=300,000 kPa max; m=0.300 min | 0 | -6 | -12 | -18 | -24 | -30 | | 0 | -6 | -12 | -18 | -24 | -30 | | 0 | -6 | -12 | -18 | -24 | -30 | |
| Direct Tension (SHRP B-008): Failure Strain, 1.0 mm/min, % **** | 1.0% min | 0 | -6 | -12 | -18 | -24 | -30 | | 0 | -6 | -12 | -18 | -24 | -30 | | 0 | -6 | -12 | -18 | -24 | -30 | |

SR300% = 5.00

Temperature
At Which $1/J'' = 1$

*Fig. 4*  SR300% = 5.00

Temperature
At Which 1/J" = 2.2

Temperature
At Which LTCS = 300

SR300% = 5.00

Temperature At Which m = 0.300

ACID-REACTED POLYMER-MODIFIED ASPHALT COMPOSITIONS AND PREPARATION THEREOF

This application is a continuation of U.S. patent application Ser. No. 08/862,333, filed May 23, 1997, now U.S. Pat. No. 6,117,926 which is a continuation of U.S. patent application Ser. No. 08/402,705, filed Mar. 13, 1995, now abandoned.

FIELD OF THE INVENTION

This invention relates to acid-reacted polymer-modified asphalt compositions. More particularly, this invention relates to modified asphalt compositions comprising an asphalt, an acid, and a polymer selected from (a) certain specific ethylene-carbon monoxide polymers containing epoxy functional groups or (b) a curable blend of these polymers with an organic thermosetting resin. The novel asphalt compositions of this invention, when tested with a dynamic shear rheometer at temperatures ranging from 42° to 82° C., exhibits G*/sin (δ) stiffness values which are at least about 2 times greater than the asphalt without polymer or acid, at least about 1.5 times greater than the asphalt/polymer compositions without acid both when tested according to AASHTO TP5, exhibits G" viscous component of complex modulus values about the same as the asphalt/polymer composition without acid when tested according to AASHTO TP5 at temperatures ranging from 4° C. to 40° C., and exhibit low temperature creep stiffness and "m" values about the same as those exhibited by the asphalt without polymer or acid when tested at low temperatures ranging from −42° C. to 0° C. according to the SHRP Bending Beam Creep Stiffness test, AASHTO TP 1.

BACKGROUND OF THE INVENTION

It has long been known that a wide variety of polymeric additives can be used to produce asphalt and bitumen containing compositions (generally referred to as "polymer modified asphalt" compositions—PMA compositions) having certain enhanced properties. All types of asphalt, both naturally occurring and synthetically manufactured, are suitable for use in this invention. According to the present invention, the term "asphalt" is meant to also be inclusive of materials designated by the term "bitumen" and no distinction is made herein between the two terms. Naturally occurring asphalt is inclusive of native rock asphalt, lake asphalt, etc. Synthetically manufactured asphalt is often a by-product of petroleum refining operations and includes air-blown asphalt, blended asphalt, cracked or residual asphalt, petroleum asphalt, propane asphalt, straight-run asphalt, thermal asphalt, etc.

Asphalt has both viscous properties, which allow it to flow, and elastic properties, which resist flow. At high temperatures, the viscous properties dominate and the asphalt tends to flow or deform. At low temperature, the elastic properties dominate and the asphalt tends to resist flow. By adding certain polymers, these natural characteristics of asphalt can be modified. The properties improved by the addition of polymers are resistance to high temperature thermal deformation ("creep" or "rutting"), as well as resistance to cracking or deforming under repeated loadings, and, perhaps, the ability to use reduced amounts of asphalt in asphaltic aggregate compositions without loss of desired properties.

Goodrich, U.S. Pat. No. 5,331,028, issued Jul. 19, 1994, and assigned to Chevron, relates to a PMA composition comprising asphalt, a glycidyl-containing ethylene copolymer and a styrene/conjugated diene block copolymer. The Goodrich PMA composition can be used in preparation of asphalt concrete and is said to have enhanced resistance to thermal and pressure induced deformation.

Another Goodrich patent, U.S. Pat. No. 5,306,750, issued Apr. 26, 1994, and assigned jointly to Chevron and Du Pont, relates to a thermoplastic polymer-linked-asphalt product said to evidence enhanced performance properties even at low polymer concentrations. Among the polymers which can be used in the PMA compositions of both Goodrich patents are reactant polymers containing an epoxide moiety which is said to react with the asphalt. Preferred polymers for both Goodrich compositions are of the generalized formula:

E symbolizes an ethylene copolymer unit. X symbolizes a polymer unit of the formula:

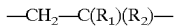

wherein $R_1$ is hydrogen, methyl or ethyl, and $R_2$ is —C(O)OR$_3$, —OC(O)R$_3$, or —OR$_3$, and wherein $R_3$ is a lower alkyl group. Y symbolizes a copolymer unit of the formula:

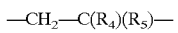

wherein $R_4$ is hydrogen or methyl, and $R_5$ is an epoxide-containing moiety of the formula

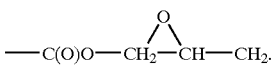

The polymers used in the PMA compositions of these two Goodrich patents are said to be well known in the art and are described, for example, in U.S. Pat. No. 4,070,532, issued Jan. 24, 1978 and in U.S. Pat. No. 4,157,428, issued Jun. 5, 1979, both by Clarence F. Hammer and both assigned to Du Pont. The polymers described in the Hammer patents and incorporated into the PMA compositions of the Goodrich patents include a polymer modifier known by the trade name, ELVALOY™ AM, available from Du Pont. ELVALOY™ AM is characterized by Du Pont as a polymer modifier to extend asphalt pavement life and to provide improvements in asphalt compatibility, mix stability, handling characteristics and product performance. Chevron makes available a PMA composition which contains the Du Pont ELVALOY™ AM, typically at polymer levels of about 1–3% by weight of the PMA composition.

Other processes for forming asphaltic products have been known to utilize acid treatment in conjunction with the addition of certain other earlier known polymers. For example, Benjamin S. Santos, U.S. Pat. No. 5,288,392, issued Feb. 22, 1994, relates to a process for converting acid sludge from waste oil refineries into an intermediate for production of asphaltic mixtures. The acid sludge is described as containing such non-specifically defined components as resinous and asphaltic materials and undefined hydrocarbon polymers. However, the unidentifiable polymers contained in this acid sludge are not related structurally or chemically to the polymers described by the Goodrich and Hammer patents or to the specific polymers used according to the present invention.

Three patents have issued to Lyle E. Moran, U.S. Pat. No. 4,882,373, issued Nov. 21, 1989 (Moran I), U.S. Pat. No. 5,070,123, issued Dec. 3, 1991 (Moran II), and U.S. Pat. No.

5,095,055, issued Mar. 10, 1992 (Moran III), which all relate to premodification of asphalt with an acid, such as HCl and $H_3PO_4$, and then subsequent addition of a thermoplastic block copolymer.

Specifically, Moran I is said to improve the tensile properties of asphalt compositions by contacting asphalt with a mineral acid, bubbling an oxygen-containing gas through the acid treated asphalt, adding a thermoplastic elastomer to the treated asphalt and finally adding an unsaturated functional monomer to the polymer modified asphalt. Moran II and III dispense with the use of oxygen-containing gas and elaborate on a variety of acids and polymers which may be added to the asphalt composition to improve its storage stability. The processes of the Moran II and III patents are said to yield a more highly stabilized PMA composition by adding the acid simultaneously with or subsequent to the addition of the polymer.

In addition, Moran III acknowledges an earlier German Offen. 2 255 173 by Shell, published May 16, 1974, which relates to the addition of styrenic thermoplastic elastomers and small amounts of phosphoric acid or hydrochloric acid to asphalt to produce stabilized PMA compositions.

Other patent disclosures contain further descriptions of various acid and polymer treatments of bituminous or asphaltic materials. According to U.S. Pat. No. 4,368,228 of Romolo Gorgati, issued Jan. 11, 1983, bitumen obtained from acid sludge produced by concentrated sulfuric acid treatment of heavy distillates of asphalt-based petroleum is mixed with certain thermoplastic polymers to prepare prefabricated waterproofing membrane for roofing materials. U.S. Pat. No. 3,915,730 of Jean Lehureau, et al., issued Oct. 28, 1974, describes a surface paving material which is a composition of matter comprising 2,2-bis (4-cyclohexanol) propane diglycidyl ether, and a curing agent with a bituminous material derived from treatment of petroleum with boiling sulfuric acid.

Processes for acidic treatment of asphaltic or bituminous materials without the additional presence of polymers are related by two patents to Gordon Schneider, U.S. Pat. No. 4,238,241, issued Dec. 9, 1980 and U.S. Pat. No. 4,331,481, issued May 25, 1982. According to the Schneider patents, the amount of asphalt required in asphalt compositions or in asphalt and aggregate compositions is said to be decreased by the addition of sulfonic acid to the hot composition mix, without any detrimental effects on the strength and durability of the final paving material.

Each of these patents describe certain ways of improving the properties of a variety of asphaltic and bituminous materials. However, there is still a need for PMA compositions which are able to achieve high stiffness values at high ambient temperatures while at the same time maintaining needed low temperature stiffness properties.

According to the present invention, it has unexpectedly and surprisingly been discovered that the use of certain acids in the formulation of PMA compositions using certain polymers as described by the Goodrich and Hammer patents (and particularly ELVALOY™) provides advantageous benefits to the process of formulating the PMA composition and also lends desirable properties to the resultant PMA composition. The PMA compositions of the present invention can be used for long wearing paving and other applications in climatic zones having a wide range of high summer and low winter temperatures without unacceptable thermally induced creep and/or crack problems.

Currently, standardized specifications and test methods for asphaltic binders are in a state of transition. The asphalt industry, Federal Highway Administration (FHWA), and individual state transportation departments are converting to specifications and test methods developed over several years by the Asphalt Research Output and Implementation Program of the Strategic Highway Research Program (SHRP). The SHRP specifications and test methods have been recommended by the FHWA to be in general, although voluntary, usage for materials for all state and federal highway programs by 1997. The PMA compositions of the present invention have all been tested and their properties and use characteristics have been determined according to the most recent SHRP specifications and test methods, in addition to many standard PMA tests. The specific tests methods are described in detail in publication "SIP-A-370" titled "Binder Characterization and Evaluation Volume 4: Test Methods" This volume is published by the Strategic Highway Research Program of the National Research Council headquartered in Washington, D.C. The specific test methods used to identify the improved properties of this invention are: AASHTO TP5 Determining the Rheological Properties of Asphalt Binder Using a Dynamic Shear Rheometer (DSR), and AASHTO TP1 Determining the Flexural Creep Stiffness of Asphalt Binder Using the Bending Beam Rheometer (BBR). AASHTO is the American Association of State Highway and Transportation Officials.

SHRP asphalt binder specifications are based primarily on properties related to performance of the laid down pavement, particularly in regard to performance under varying pavement conditions of imposed weight load and temperature. SHRP asphalt binder specifications are designed around the climatic conditions in the region where the asphalt composition will be used. SHRP test methods measure properties that are, based on SHRP supported research, believed to be directly correlated to pavement performance.

The testing used for the SHRP specifications measures the temperature range over which a given asphalt exhibits the properties qualifying it as an acceptable pavement binder for a given set of temperature and traffic conditions. These specifications utilize measurements of the complex shear modulus (G*), which represents total applied stress ($\tau_{total}$) and total strain ($\varepsilon_{total}$), along with the phase angle ($\delta$), which characterizes the viscoelastic nature of the binder. Expected pavement performance is then represented by a combination of G* with $\delta$: G*/sin ($\delta$), also known as 1/J", for minimum high temperature stiffness (to resist permanent deformation) and G*×sin ($\delta$), also known as G", for maximum intermediate temperature stiffness (to reduce fatigue cracking). Various SHRP performance grades (PG) have been established according to the criteria of the testing.

Specific criteria for SHRP performance grades and the tests used in determining them are described below. FIGS. 1 and 2 provide SHRP specifications for performance grades PG 52-10 through PG 82-40. The two numbers that designate the SHRP grade bracket the temperature range, the SHRP DELTA (SHRP Δ), over which a given SHRP asphalt grade exhibits the performance properties that have been established by SHRP. If one simply adds together the absolute values of the two temperatures that identify the high and low temperatures where all SHRP criteria are met, the SHRP Δ is calculated. For an asphalt that conforms to a SHRP grade PG 64-22, one would add 64+|1−22| and arrive at a value of 86 degrees. One can, however, take this process one step further. Applying statistical analysis to the data generated from the SHRP asphalt binder tests, one can calculate the exact temperatures at which an asphalt binder will conform to the high and low temperature SHRP requirements. In essence one can determine a precise SHRP grade for any given asphalt binder and in so doing be able to calculate a precise SHRP Δ for that asphalt binder. For example, the asphalt binder above which conforms to a SHRP grade PG 64-22 could have a SHRP Δ that equals 91° C. if the high temperature specification were met at exactly 67° C. and the low temperature specification were met at exactly −24° C. A precise SHRP grade for this material would be PG 67-24 and the SHRP Δ would be 91 degrees. Generally speaking to achieve a SHRP Δ of 98 degrees or greater will require some type of asphalt modification, and only high quality conventional asphalt binders will exhibit a SHRP Δ between 92 degrees and 98 degrees.

Dynamic Shear, AASHTO TP5, is determined both before and after simulated aging in the Rolling Thin Film Oven (RTFO) test to determine a minimum binder stiffness as exhibited in freshly paved roads up to one year in age and after the Pressure Aging Vessel (PAV) test to determine the maximum binder stiffness as exhibited in a pavement up to 5 or more years of age.

Bending Beam Creep Stiffness, AASHTO TP1, is determined after RTFO and PAV aging. The Bending Beam Creep Stiffness test measures low temperature stiffness characteristics. A 5"×¼"×½" beam of binder material is molded, cooled to testing temperature, and subjected to an imposed weight load. Load versus deflection data is collected for 240 seconds. The low temperature specification values are based on the stiffness value determined at 60 seconds and the absolute value of the slope (m-value) of the time vs. log (stiffness) curve determined at 60 seconds.

Direct Tension, AASHTO TP3, is also determined after RTFO and PAV aging. The Direct Tension test measures per cent strain at low temperatures. A "dogbone" shaped specimen is elongated at low temperature, at a constant strain rate, until it fractures. The test is generally not performed unless the Bending Beam Creep Stiffness test passes the slope requirement and fails the stiffness requirement.

SUMMARY OF THE INVENTION

The present invention provides an acid-reacted polymer-modified asphalt composition comprised as follows:
(A) at least about 80 weight percent, based upon the composition, of an asphalt;
(B) about 0.2 to about 15 weight percent, based upon the composition, of a polymer containing available epoxy groups and having an average molecular weight of at least 2000; and
(C) an amount of an acid effective for promoting chemical bonding between the asphalt and the polymer and producing a composition exhibiting substantially improved Dynamic Shear Rheometer stiffness values, which when tested with a dynamic shear rheometer at temperatures ranging from 42° to 82° C., exhibits G*/sin (δ) stiffness values which are at least about 2 times greater than stiffness values for the asphalt without polymer or acid, at least about 1. 5 times greater than an asphalt/polymer composition without acid, when tested according to AASHTO TP5, exhibits G" viscous component of complex modulus values about the same as the asphalt/polymer composition without acid, when tested according to AASHTO TP5 at temperatures ranging from 4° C. to 40° C., and exhibits low temperature creep stiffness and "m" values about the same as those exhibited by the asphalt without polymer or acid, when tested at low temperatures ranging from −42° C. to 0° C. according to the SHRP Bending Beam Creep Stiffness test, AASHTO TP1.

The asphalt composition described immediately above can be used in an asphalt emulsion comprising 50 to 80 weight percent, based upon the asphalt emulsion, of the asphalt composition, 0.05 to 5.0 weight percent, based upon the asphalt emulsion, of a suitable asphalt emulsifying surfactant, and water.

The present invention also provides a specific acid-reacted polymer-modified asphalt composition comprised as follows:
(A) about 99.8 to about 80 weight percent, based upon the composition, of an asphalt;
(B) about 0.2 to about 15 weight percent, based upon the composition, of a polymer selected from:
  (1) an ethylene-carbon monoxide terpolymer containing epoxy side groups; and
  (2) a curable blend comprising 1–99 weight percent of said terpolymer, based upon the blend, and 99–1 percent by weight of an organic thermosetting resin with which said terpolymer is only functionally compatible, based upon the blend; and
(C) about 0.02 to about 5.0 weight percent, based upon the composition, of an acid effective for promoting chemical bonding between the asphalt and the polymer; wherein said terpolymer comprises
  (a) 40–90 weight percent of ethylene, based upon the terpolymer;
  (b) 0–20 weight percent of carbon monoxide, based upon the terpolymer;
  (c) 5–40 weight percent, based upon the terpolymer, of a monomer copolymerizable therewith, said monomer taken from the class consisting of unsaturated mono- and dicarboxylic acids of 3–20 carbon atoms, esters of said unsaturated mono- or dicarboxylic acids, vinyl esters of saturated carboxylic acids where the acid group has 1–18 carbon atoms, vinyl alkyl ethers where the alkyl group has 1–18 carbon atoms, acrylonitrile, methacrylonitrile, alpha-olefins of 3–20 carbon atoms, norbornene and vinyl aromatic compounds; and
  (d) 0.1–15 weight percent, based upon the terpolymer, of an ethylenically unsaturated monomer of 4–21 carbon atoms containing an epoxy group; and wherein said resin is selected from the group consisting of phenolic resins, epoxy resins, and melamine formaldehyde resins; such that the asphalt composition when tested with a dynamic shear rheometer at temperatures ranging from 42° to 82° C., exhibits stiffness values [G*/sin (δ) at a testing frequency of 10 radians/second], which are at least about 2 times greater than stiffness values of the asphalt without polymer or acid, at least about 1.5 times greater than an asphalt/polymer composition without acid when tested according to AASHTO TP5, exhibits viscous component of complex modulus [G*×sin (δ) or G" at a frequency of 10 radians/sec] values about the same as the asphalt/polymer composition without acid when tested according to AASHTO TP5 at temperatures ranging from 4° C. to 40° C., and exhibits low temperature creep stiffness and "m" values about the same as those exhibited by the asphalt without polymer or acid when tested at low temperatures ranging from −42° C. to 0° C. according to the SHRP Bending Beam Creep Stiffness test, AASHTO TP 1.

The specific asphalt composition just described can be used in an asphalt emulsion comprising 50 to 80 weight percent, based upon the asphalt emulsion, of the specific asphalt composition, 0.05 to 5.0 weight percent, based upon the asphalt emulsion, of a suitable asphalt emulsifying surfactant, and water.

This specific asphalt composition can be used in an asphalt emulsion comprising 30 to 80 weight percent, based on the asphalt emulsion, of the specific asphalt composition, 0.5 to 20 weight percent, based on the asphalt emulsion, of a petroleum solvent having a flash point, as determined by ASTM D 56 or D 92, whichever is appropriate to the solvent, of 15° C. to 250° C., 0.05 to 5.0 weight percent, based on the asphalt emulsion, of suitable asphalt emulsifying surfactant, and water. This specific asphalt composition can be used in an asphalt emulsion comprising 48 to 80 weight percent, based upon the asphalt emulsion, of the specific asphalt composition, 0.05 to 5.0 weight percent, based upon the asphalt emulsion, of a suitable asphalt emulsifying surfactant, 0.02 to 2.0 weight percent of a cationic adhesion promoter, and water. This specific asphalt composition can be used in an asphalt emulsion comprising 28 to 80 weight percent, based on the asphalt emulsion, of the specific asphalt composition, 0.5 to 20 weight percent, based on the asphalt emulsion, of a petroleum solvent having a flash point, as determined by ASTM D 56 or D 92, whichever is appropriate to the solvent, of 15° C. to 250° C., 0.05 to 5.0 weight percent, based on the asphalt emulsion, of suitable asphalt emulsifying surfactant, 0.02 to 2.0 weight percent, based on the asphalt emulsion, of a cationic adhesion promoter, and water.

The specific asphalt composition just described can be used in a cutback asphalt comprising 40 to 98 volume percent, based on the cutback asphalt, of the specific asphalt composition, and 2 to 60 volume percent, based on the cutback asphalt, of a petroleum solvent having a flash point as determined by ASTM D 56 or D 92, whichever is appropriate to the solvent, of between 15° C. and 250° C. The specific asphalt composition just described can be used in a cutback asphalt comprising 38 to 98 volume percent, based on the cutback asphalt, of the specific asphalt composition, 0.02 to 2.0 weight percent, based on the cutback asphalt, of a cationic adhesion promoter, and 2 to 60 volume percent, based on the cutback asphalt, of a petroleum solvent having a flash point as determined by ASTM D 56 or D 92, whichever is appropriate to the solvent, of between 15° C. and 250° C.

The present invention also provides an aggregate mix composition comprising from about 90 to about 99 weight percent, based upon the final mix, of an aggregate with from about 1 to about 10 weight percent, based upon the final mix composition, of any of the acid-reacted polymer-modified asphalt compositions as just previously described.

In addition, the present invention provides a process for preparing an acid-reacted polymer-modified asphalt composition comprising:
(i) forming a reaction mixture comprising
  (A) at least about 80 weight percent, based upon the composition, of an asphalt;
  (B) about 0.2 to about 15 weight percent, based upon the composition, of a polymer containing available epoxy groups and having an average molecular weight of at least 2000; and
  (C) an amount of an acid effective for promoting chemical bonding between the asphalt and the polymer; and
(ii) mixing said reaction mixture under conditions sufficient for promoting chemical bonding between the asphalt and the polymer and producing said composition, so that said composition when tested with a dynamic shear rheometer at temperatures ranging from 42° to 82° C., exhibits stiffness values [G*/sin (δ) at a testing frequency of 10 radians/second], which are at least about 2 times greater than the asphalt without polymer or acid, at least about 1.5 times greater than the asphalt/polymer compositions without acid when tested according to AASHTO TP5, exhibits viscous component of complex modulus (G*×sin (δ) or G" at a frequency of 10 radians/sec) values about the same as the asphalt/polymer composition without acid when tested according to AASHTO TP5 at temperatures ranging from 4° C. to 40° C., and exhibits low temperature creep stiffness and "m" values about the same as those exhibited by the asphalt without polymer or acid when tested at low temperatures ranging from −42° C. to 0° C. according to the SHRP Bending Beam Creep Stiffness test, AASHTO TP1.

The present invention also provides a process for preparing an acid-reacted polymer-modified asphalt composition comprising:
(i) forming a reaction mixture comprising
  (A) about 99.8 to about 80 weight percent, based upon the composition, of an asphalt;
  (B) about 0.2 to 15 weight percent, based upon the composition, of a polymer selected from
    (1) an ethylene-carbon monoxide terpolymer containing epoxy side groups; and
    (2) a curable blend comprising 1–99 weight percent, based upon the blend, of said terpolymer and 1–99 percent by weight, based upon the blend, of an organic thermosetting resin with which said terpolymer is only functionally compatible; and
  (C) about 0.02 to about 5.0 weight percent, based upon the composition, of an acid effective for promoting chemical bonding of the asphalt and the polymer; and wherein said terpolymer comprises
    (a) 40–90 weight percent of ethylene, based upon the terpolymer;
    (b) 0–20 weight percent of carbon monoxide, based upon the terpolymer;
    (c) 5–40 weight percent, based upon the terpolymer, of a monomer copolymerizable therewith, said monomer taken from the class consisting of unsaturated mono- and dicarboxylic acids of 3–20 carbon atoms, esters of said unsaturated mono- or dicarboxylic acids, vinyl esters of saturated carboxylic acids where the acid group has 1–18 carbon atoms, vinyl alkyl ethers where the alkyl group has 1–18 carbon atoms, acrylonitrile, methacrylonitrile, alpha-olefins of 3–20 carbon atoms, norbornene and vinyl aromatic compounds; and
    (d) 0.1–15 weight percent, based upon the terpolymer, of an ethylenically unsaturated monomer of 4–21 carbon atoms containing an epoxy group; and
  wherein said resin is selected from the group consisting of phenolic resins, epoxy resins, and melamine formaldehyde resins; and
(ii) mixing said reaction mixture under conditions sufficient for promoting chemical bonding between the asphalt and the polymer and producing said composition, so that said composition when tested with a dynamic shear rheometer at temperatures ranging from 42° to 82° C., exhibits stiffness values [G* /sin (δ) at a testing frequency of 10 radians/second], which are at least about 2 times greater than the asphalt without polymer or acid, at least about 1.5 times greater than an asphalt/polymer composition without acid when tested according to AASHTO TP5, exhibits viscous component of complex modulus [G*×sin (δ) or G" at a frequency of 10 radians/sec] values about the same as the asphalt/polymer composition without acid when tested according to AASHTO TP5 at temperatures ranging from 4° C. to 40° C., and exhibits low temperature creep stiffness and "m" values about the same as those exhibited by the asphalt without polymer or acid when tested at low temperatures ranging from −42° C. to 0° C. according to the SHRP Bending Beam Creep Stiffness test, AASHTO TP1.

BRIEF DESCRIPTION OF THE DRAWINGS

FIGS. 1 and 2 provide SHRP specifications for asphalt binders grades PG 52 through PG 82.

DETAILED DESCRIPTION OF THE INVENTION

Figure 3:
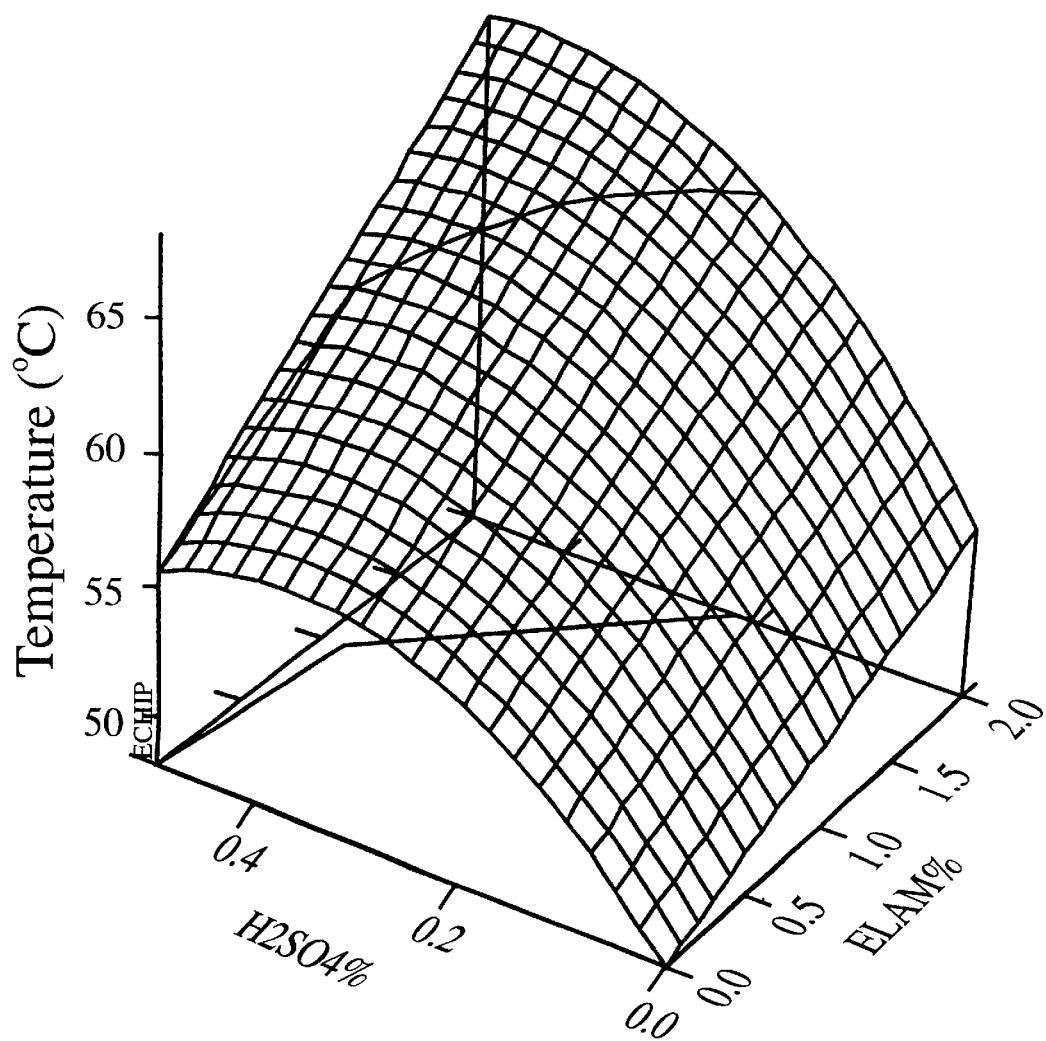
FIG. 3 is a three dimensional graph of effects for response '1/J"=1'.

Many presently available asphalt compositions are not able to meet the demanding requirements of the newer SUP specifications for climate zones having widely varying climatic conditions of low winter and high summer temperatures. Polymer modification according to the present invention provides improved PMA compositions to meet the newer SHRP specifications and thus of a wider variety of climate zones.

As has been discussed above, the present invention involves the use of acid of sufficient concentration and acidity to initiate the reaction of certain polymers with asphalt in preparing PMA compositions such that the composition, when tested with a dynamic shear rheometer at temperatures ranging from 42° to 82° C., exhibits G*/sin (δ) stiffness values, which are at least about 2 times greater than the asphalt without polymer or acid, at least about 1.5 times greater than the asphalt/polymer compositions without acid when tested according to AASHTO TP5, exhibits G" viscous component of complex modulus values about the same as the asphalt/polymer composition without acid when tested according to AASHTO TP5 at temperatures ranging from 4° C. to 40° C., and exhibits low temperature creep stiffness and "m" values about the same as those exhibited by the asphalt without polymer or acid when tested at low temperatures ranging from −42° C. to 0° C. according to the SHRP Bending Beam Creep Stiffness test, AASHTO TP 1.

When referred to throughout this specification and the claims, G*/sin (δ) stiffness values are as calculated at a testing frequency of 10 radians/second when tested according to AASHTO TP5. When referred to throughout this specification and the claims, G" viscous component of complex modulus values mean G*×sin (δ) or G" values as calculated at a frequency of 10 radians/sec when tested according to AASHTO TP5 at temperatures ranging from 4° C. to 40° C.

All types of asphalt, both naturally occurring and synthetically manufactured, are suitable for use in this invention. According to the present invention, the term "asphalt" is meant to also be inclusive of materials designated by the term "bitumen" and no distinction is made herein between the two terms. Naturally occurring asphalt is inclusive of native rock asphalt, lake asphalt, etc. Synthetically manufactured asphalt is often a by-product of petroleum refining operations and includes air-blown asphalt, blended asphalt, cracked or residual asphalt, petroleum asphalt, propane asphalt, straight-run asphalt, thermal asphalt, solvent extracted asphalt or asphalt pitches, etc. A preferred asphalt for the present invention has an initial viscosity at 60° C. of 20 to 50,000 poise. "Initial viscosity", as herein intended, designates the asphalt viscosity prior to addition of polymers and/or acids. Preferably, the asphalt has a viscosity of 50 to 10,000, even more preferably 50 to 4000, and most preferably 50 to 3000 poise.

The acids which may be used in the present invention include those acids which are an electron pair acceptor (also sometimes referred to as a Lewis acid) or a proton donor (also sometimes referred to as a Brønsted acid). Electron pair acceptor acids suitable for use according to this invention are inclusive of boron trifluoride and its complexes, aluminum trichloride, stannic tetrachloride, aluminum sulfate, aluminum chloride and ferric chloride, or any blends thereof Proton donor acids suitable for use according to this invention are inclusive of mineral acids, such as sulfuric acid, hydrochloric acid, phosphoric acid and nitric acid, and low molecular weight organic acids, such as glacial acetic acid or any blends thereof In addition, it has also been discovered that anionic soaps, that is alkali salts of long chain fatty acids or rosin acids, may also functionally replace an acid according to the present invention. Such soaps include saponified tall or other crude commodity oils or manufactured oils such as dodecylbenzene sulfonic acid or refined or reacted oils such as refined tall oils, rosin acids, oleic acid, stearic acid, or sulfonated versions of any of the above.

It has further been found that styrene butadiene rubber latexes, generally referred to as SBR latexes, will, when added to an asphalt with subsequent removal of the water present in the SBR latex and followed by addition of ELVALOY™ as described above, result in the improvement noted with the addition of anionic soaps. This is believed to occur because of the use of potassium soaps containing disproportionated rosin acids as the dispersion system for the emulsion polymerization process used to manufacture the SBR latex. This improved result has been found to occur whether or not true anionic SBR latex is used or so called cationic SBR latex is used. In point of fact "cationic" SBR latexes are formed as anionic latexes to which a cationic surfactant is post added. The basic chemistry of the emulsion polymerization of both products is the same.

The specific amount of acid to be added will vary according to the specific acid used, the specific asphalt, the specific polymer and the desired characteristics of the final PMA composition, but can readily be determined by the skilled worker. Generally, the acid should be of sufficient concentration and acidity to effect complete reaction of the asphalt with the polymer. The presently preferred acids are sulfuric acid or phosphoric acid and typical amounts of acid range between about 0.05 to 5.0% by weight of the final PMA blend, with an amount of about 0.10% to 0.75% by weight of the final PMA blend presently preferred.

The polymers which can be used according to the present invention are known and are commercially available. Suitable polymers contain available epoxy groups and have an average molecular weight of at least 2000. The term "available epoxy groups", for the purposes of this invention, means epoxy groups which are chemically and physically situated within the polymer molecule so that they are accessible for chemical bonding with the asphalt.

Suitable polymers for use in this invention are described, for example, in U.S. Pat. No. 4,070,532, issued Jan. 24, 1978 and in U.S. Pat. No. 4,157,428, issued Jun. 5, 1979, both to Clarence F. Hammer and both assigned to Du Pont. Such polymers are selected from:

(1) an ethylene-carbon monoxide terpolymer containing epoxy side groups; and (2) a curable blend comprising 1–99 weight percent of said terpolymer, based upon the blend, and 99–1 percent by weight of an organic thermosetting resin with which said terpolymer is only functionally compatible, based upon the blend; and wherein said terpolymer comprises (a) 40–90 weight percent of ethylene, based upon the terpolymer;

(b) 0–20 weight percent of carbon monoxide, based upon the terpolymer;

(c) 5–40 weight percent, based upon the terpolymer, of a monomer copolymerizable therewith, said monomer taken from the class consisting of unsaturated mono- and dicarboxylic acids of 3–20 carbon atoms, esters of said unsaturated mono- or dicarboxylic acids, vinyl esters of saturated carboxylic acids where the acid group has 1–18 carbon atoms, vinyl alkyl ethers where the alkyl group has 1–18 carbon atoms, acrylonitrile, methacrylonitrile, alpha-olefins of 3–20 carbon atoms, norbornene and vinyl aromatic compounds; and (d) 0.1–15 weight percent, based upon the terpolymer, of an ethylenically unsaturated monomer of 4–21 carbon atoms containing an epoxy group; and wherein said resin is selected from the group consisting of phenolic resins, epoxy resins, and melamine formaldehyde resins.

A particularly suitable polymer modifier for use according to the present invention is ELVALOY™ AM available from Du Pont. ELVALOY™ AM is characterized by Du Pont as a polymer modifier to extend asphalt pavement life and to provide improvements in asphalt compatibility, mix stability, handling characteristics and product performance. In addition, other polymers of the "ELVALOY™ FAMILY," that is, co-polymers containing glycidyl methacrylate or glycidyl acrylate as epoxy-bearing moieties, may also be used.

The specific amount of polymer to be added to the asphalt will vary according to the specific polymer used, the specific asphalt, the specific acid and the desired characteristics of the final PMA composition, but can readily be determined by the skilled worker. Typical amounts of polymer range between about 1–8% by weight of the final PMA blend.

Various processing oils may also be added to the PMA compositions of this invention. Such oils are marketed by the Shell Oil Company, Sun Refining, and other petroleum refiners and include oils classified as naphthenic, paraffinic, or aromatic oils. Preferred oils exhibit low pour points, low volatility, and efficacy in a manner where the least added amount reduces the temperature at which the stiffness of the binder exceeds $3\times10^5$ kilopascals and the "m" value of the binder falls below 0.300 when tested according to the SHRP Bending Beam Flexural Creep Stiffness test, AASHTO TP1.

The acid-reacted PMA compositions of the present invention can be used in an aggregate mix composition comprising from about 90 to about 99 weight percent, based upon the final mix, of an aggregate with from about 1 to about 10 weight percent, based upon the final mix composition, of an acid-reacted PMA compositions. For the purposes of this invention, the term aggregate refers any typical aggregate, including a mixture of sand and gravel, any natural or synthetic aggregate, recycled asphalt material (RAP), and granulated re-used or recycled pavement material.

The term "functional compatibility" in the practice of the present invention refers to a degree of compatibility between two polymer materials that might appear to be incompatible as evidenced by two phases. Nevertheless, the blend is strong and tough because the two materials are functionally compatible.

This functional compatibility occurs because the two phases are interdependent and not pure phases of the starting resins. Each phase contains a small amount of the other resin. In fact, in molten two-phase blends of this type, there is an equilibrium condition with a constant migration of molecules across the phase boundaries. One theory suggests that the cooled sample has some molecules trapped part way across the boundary and thereby imparting the improved mechanical performance. Functional compatibility between two resin materials is also discussed in U.S. Pat. No. 4,157,428 (Hammar).

Because the acid-reacted polymner-modified asphalt compositions of this invention are hydrophobic and have good adhesiveness and weatherability, they can also be used for such purposes as a coating for roofing shingles.

Among advantages to be noted in the process of formulating the PMA compositions of this invention are completion of reaction in distinctly shorter processing times and at distinctly lower processing temperatures. Processing is complete in no more than about 24 hours and at temperatures ranging from about 135° C. to about 185° C., preferably about 150–170° C. Shorter processing times and lower processing temperatures mean economic savings in terms of having the final product PMA compositions more quickly available and in terms of freeing processing equipment for further re-use.

SPECIFIC EXAMPLES

Example A

A comparative prior art formulation, PMA Formulation 1, not containing an acid was made by combining Amoco AC-5: an asphalt available from Amoco; and ELVALOY™ AM: 1.75% by weight of the final blend. In the following manner: asphalt, under low shear agitation, was heated to a temperature of about 155° C. wherein the polymer was introduced. The temperature was then increased to and maintained at 165° C., the "reaction temperature." Within approximately one hour, the polymer was successfully dispersed and an initial G*×sin (δ) reading was taken. The sample was maintained at the reaction temperature, with agitation, for a total of 66 hours whereupon the full battery of SHRP tests were conducted. During the 66 hours reaction time, a total of eight G*×sin (δ) measurements were taken to monitor the progress of the reaction.

A comparative prior art formulation, PMA Formulation 2, not containing an acid was made by combining Amoco AC-5: an asphalt available from Amoco; and ELVALOY™ AM: 1.75% by weight of the final blend. In the following manner: asphalt, under low shear agitation, was heated to a temperature of about 155° C.

wherein the polymer was introduced. The temperature was then increased to and maintained at 185° C., the "reaction temperature." Within approximately one hour, the polymer was successfully dispersed and an initial G*×sin (δ) reading was taken. The sample was maintained at the reaction temperature, with agitation, for a total of 48 hours. The full battery of SHRP tests were not run on Formulation 2 because of the similarity of the viscous modulus profiles between Formulation 1 and 2. During the 48 hours reaction time, a total of eleven G*×sin (δ) measurements were taken to monitor the progress of the reaction.

To illustrate the improvement over prior art, PMA Formulation 3, according to this invention, was made by combining Amoco AC-5: an asphalt available from Amoco;

ELVALOY™ AM: 1.75% by weight of the final blend; and

Sulfuric acid: 0.5% by weight of the final blend. In the following manner: asphalt, under low shear agitation, was heated to a temperature of around 155° C. wherein the polymer was introduced. Once the polymer was dispersed, an aliquot of the sample was removed, and reduced in temperature to 140° C. prior to the introduction of the sulfuric acid. Once the visible reaction, some slight foaming, had ceased, an initial sample was taken. After 24 hours at 140° C., the acid reacted aliquot was subjected to the full battery of SHRP tests.

A comparison of PMA FORMULATIONS 1, 2 and 3 indicates that the effect of the addition of the acid in FORMULATION 3, according to this invention, is threefold: first is the time in which the formulation reaches its final properties; second is the relative impact of temperature on the G*×sin (δ) stiffness values (TABLE 1) between Formulation 1 (165° C.), Formulation 2 (185° C.) and Formulation 3 (140° C.); and third is that the final SHRP properties (TABLE 2) represent an improvement over those where acid is not used:

TABLE 1

| Trial SAMPLE | HOUR | 24 HOUR | 66 or 48 HOUR |
|---|---|---|---|
| AMOCO AC-5 | 0.53 kPa | — | — |
| FORMULATION 1 | 0.70 kPa | 1.16 kPa | 1.44 kPa @ 66 |
| FORMULATION 2 | 0.76 kPa | 1.15 kPa | 1.50 kPa @ 48 |
| FORMULATION 3 | 2.46 kPa | 2.39 kPa | — |

60° C. G* × SIN(δ) at

Through the use of time-temperature superposition SHRP researchers developed techniques for determining the low temperature performance properties of asphalt at a test temperature 10° C. warmer than the actual target temperature. This shift in testing temperature greatly reduces the amount of time needed to conduct a low temperature stiffness test. To accurately identify the correct low temperature at which a SHRP graded asphalt will perform, one must subtract 100° C. from the temperature at which the low temperature stiffness equals 300 MPa or the temperature at which the "m" (slope) value equals 0.300. Therefore, in the example above the Amoco AC-5 will have acceptable stiffness at a service temperature of −33.4° C. and acceptable slope at −32.7° C. Understanding the procedure is important for determining the correct SHRP grade of an asphalt and also for calculating the SHRP Δ.

The SHRP Δ is a measure of the effective temperature range of a pavement binder. The correct high temperature grade is determined by examining the 1/J" values of the unaged and RTFO samples. Whichever sample achieves the 1/J" SHRP target value at the lowest temperature will determine the high temperature grade of the asphalt. The correct low temperature grade is determined by first subtracting 10° C. from both the stiffness and slope results and then determining which parameter meets the SHRP target values at the highest temperature. This is the temperature at which all SHRP low temperature criteria are met. If one then adds the value of the high temperature grade to the absolute value of the low temperature grade, the sum is what we are calling the "SHRP Δ". In the SHRP data listed above the SHRP Δ for Amoco AC-5 is calculated as 55.3°+|−32.7°| which is 88° as shown. The SHRP Δ of the Amoco AC-5 improves by 7.6° C. with the addition of 1.75% ELVALOY™ AM and another 8.9° C. with the addition of 0.5% H$_2$SO$_4$. The increase in the SHRP Δ for Formulation 3, the current invention, is largely attributed to the increase in the unaged 1/J" measurement which is 5.2 times greater than the asphalt without polymer or acid and 2.0 times greater than the asphalt/polymer composition without acid. Surprisingly, the acid treated sample showed some improvement in low temperature properties compared to the sample of Formulation 1.

Example B

According to the blending methods of Example A with the exception that samples containing ELVALOY™ AM without acid were reacted, unagitated, for only 24 hours at 165° C., the following formulations were prepared with Moosejaw 200/300, a pen graded asphalt from Moosejaw Refining

TABLE 2

TEMPERATURES [DEG C.] AT TARGET SHRP PROPERTIES

| SAMPLE | 1/J" @ 58° C. [kPa] | UNAGED ° C. @ 1/J" = 1 kPa | RTFO @ 1/J" = 2.2 kPa | PAV @ G" =5000 kPa | PAV @ STIFF. = 300 MPa | PAV @ SLOPE = 0.300 | SHRP Δ [DEG C.] |
|---|---|---|---|---|---|---|---|
| AMOCO AC-5 | 0.70 | 55.3 | 56.3 | 14.0 | −23.4 | −22.7 | 88.00 |
| FORMULATION 1 | 1.86 | 64.0 | 65.3 | 14.9 | −21.6 | −22.0 | 95.60 |
| FORMULATION 3 | 3.66 | 71.1 | 74.1 | 13.3 | −23.4 | −23.5 | 104.50 |

LW 130, a paraffinic process oil produced by Sun Refining Co.

ELVALOY™ AM, and concentrated sulfuric acid.

at the following levels:

TABLE 3

| SAMPLE | 200/300 | LW 130 | ELVALOY ™ AM | SULFURIC ACID |
|---|---|---|---|---|
| 24A | 90.00% | 10.00% | — | — |
| 25A | 87.85% | 9.76% | 1.99% | 0.45% |
| 27A | 99.50% | — | — | 0.50% |
| 27B | 89.55% | 9.95% | — | 0.50% |
| 30A | 88.00% | 10.00% | 2.00% | — |
| 30B | 98.00% | — | 2.00% | — |

Full SHRP testing was conducted on all these compositions in addition to the base asphalt, Moosejaw 200/300:

TABLE 4

| | TEMPERATURES (DEG C.) AT TARGET SHRP PROPERTIES | | | | | SLOPE OF LOG 1/J" | |
|---|---|---|---|---|---|---|---|
| | UNAGED | RTFO | PAV | | | VS TEMP | |
| TRIAL SAMPLE | @ 1/J" = 1 kPa | @ 1/J" = 2.2 kPa | @ G" = 5000 kPa | @ STIFF. = 300 MPa | @ SLOPE = 0.300 | LINE [log (kPa)/° C.] | SHRP Δ [DEG C.] |
| 200/300 NEAT | 54.00 | 56.30 | 11.40 | −24.70 | −25.10 | −0.051 | 88.70 |
| 24A | 41.7 | 45.3 | −0.9 | −35.9 | −35.1 | −0.57 | 86.80 |
| 25A | 60.7 | 76.1 | −2.6 | −36.6 | −36.0 | −0.039 | 106.70 |
| 27A | 60.8 | 64.2 | 10.4 | −25.9 | −26.6 | −0.060 | 96.70 |
| 27B | 50.2 | 54.7 | −2.8 | −36.2 | −34.6 | −0.051 | 94.80 |
| 30A | 48.4 | 52.8 | −1.6 | −36.2 | −33.8 | −0.040 | 92.20 |
| 30B | 60.9 | 63.3 | 10.9 | −24.9 | −26.6 | −0.044 | 95.80 |

The effects of the three asphalt additives and their interactions can be resolved in the above data; doing so indicates that, in addition to the effects of the ELVALOY™ AM and the sulfuric acid individually, there is an effect from their interaction. Beginning with the neat 200/300, the SHRP grade is a PG 52-34 with a precise SHRP Δ of 88.7° C. Adding 10% LW 130 (Trial 24A) depresses the unaged 1/J" temperature over 12° C. and improves the BBR measurements by 100° C.; the result is a hypothetical PG 40-40 with a precise SHRP Δ of 86.8° C., nearly 2° C. worse than the original material. By adding 0.5% $H_2SO_4$ to the asphalt/oil blend (Trial 27B), an increase of 8.0° C. is observed in the SHRP Δ. By adding 2.0% ELVALOY™ AM to the asphalt/oil blend (Trial 30A) and reacting it for 24 hours at 165° C., the SHRP Δ increases 5.4° C. Taken individually, the acid and ELVALOY™ AM add a total of 13.4° C. to the SHRP Δ of the asphalt/oil blend.

When 1.75% ELVALOY™ AM is added to the asphalt/oil blend of Trial 24A and then treated with 0.5% $H_2SO_4$ after the polymer is dispersed (about 1 hour at 140° C.), the SHRP Δ is increased by 18° C., substantially more than the sum of the individual effects of the two additives.

This composition, Trial 25A, was blended and reacted at temperatures at or around 140° C. and had essentially achieved its final properties in two hours. This compares to 24 hours at 165° C. for Trial 30A. {It has since been determined that the unaccelerated ELVALOY™ Reaction, that is the prior art reaction without the presence of acid according to the present invention, may take temperatures up to 190° C. for periods up to 72 hours, depending on the base asphalt, to proceed to completion.]

Another measure of the quality of a pavement binder is the slope of the temperature vs. log (1/J") regression line: The closer the slope of the temperature versus log (1/J" stiffness) line gets to zero the less temperature dependent the material being tested becomes. In units of log (kPa) per degree Centigrade, the slope of the neat 200/300 was −0.051. This decreased to −0.057 with the addition of oil (24A), improved to −0.051 with the subsequent addition of $H_2SO_4$ (27B) or to −0.040 with the addition of the ELVALOY™ AM. With the addition of polymer and acid, the slope was increased to 0.039.

Most surprising and unexpected in these findings is the observation that the addition of $H_2SO_4$ may have a beneficial effect on the low temperature BBR test results. It is commonly observed that the addition of polymers, in general, can have a deleterious effect on these properties, particularly on the BBR "m" value. The addition of acid in the current invention, as observed above, may reverse this effect.

Example C

In addition to the polymer ELVALOY™ AM, which has a Melt Index of 12 g/10 sec at 190° C. and a monomer composition of 66.75% ethylene, 28% n-butyl acrylate, and 5.25% glycidyl methacrylate (the source of the pendant epoxide functionality), other ELVALOY™ polymers with different melt indices and different compositions have been evaluated with respect to the current invention. Two such compounds, "ELVALOY™ A" and "ELVALOY™ C" are characterized by Du Pont as follows:

TABLE 5

| | Melt Index | % Ethylene | % n-Butyl Acrylate | % Glycidyl Methacrylate |
|---|---|---|---|---|
| ELVALOY A | 3.90 | 60.30 | 28.30 | 11.40 |
| ELVALOY C | 4.90 | 54.50 | 34.40 | 11.10 |

Using a mixed refinery source, penetration graded 200/300 asphalt the following blends were mixed at 165° C. and reacted for 24 hours:

TABLE 6

| Trial | % LW 130 | % ELVALOY ™ A | % ELVALOY ™ C | % ELVALOY ™ AM | % H$_2$SO$_4$ |
|---|---|---|---|---|---|
| 48A | 3.00 | — | — | 1.75 | 0.25 |
| 51A | 3.00 | 1.75 | — | — | 0.26 |
| GHR 043 | 3.00 | 1.75 | — | — | — |
| 52A | 3.00 | — | 1.75 | — | 0.25 |
| GHR 042 | 3.00 | — | 1.75 | — | — |

Subjective observation of the above samples indicated that the acid treated trials may provide more useful binders as evidenced by the lack of "gel.""Gel," as commonly encountered in the polymer modification of asphalt, may result from polymer/polymer crosslinking as opposed to a polymer/asphalt reaction; at worst, it may develop into an unpumpable, dilatant liquid. An example of this undesirable condition is illustrated by the 135° C. Brookfield viscosity (ASTM test method D 4402)values for trials 5h and GHR043as shown in Table 7. The SHRP criteria for this parameter is a value of 3.00 Pa*sec (Pascal seconds) or less. As can be seen from the data the sample prepared with 1.75% of ELVALOY™ A according to this invention exhibited an acceptable Brookfield viscosity, while the sample prepared with 1.75% of ELVALOY™ A without the addition of acid exhibited a Brookfield viscosity more than 5 times greater and exhibited a gel-like physical appearance.

EXPLANATION OF RESPONSE SURFACE PLOTS

The plot in FIG. 3 is a three dimensional response surface plot of the data summarized in Example C. As can be seen from this response surface plot the temperature at which 1/J" achieves 1 kPa (the SHRP minimum for unaged asphalt) increases as the per cent of Elvaloy AM increased (the "ELAM %" axis). Also the 1/J" temperature increases and then tends to level off as the amount of sulfuric acid increases (the "H$_2$SO$_4$%" axis). However, portions of the surface that represent various combinations of these two materials show a much steeper rate of increase of the 1/J"=1 kPa temperature. In addition these interior data points correspond to a higher 1/J"=1 kPa temperature than either of the component materials independently.

Figure 4:
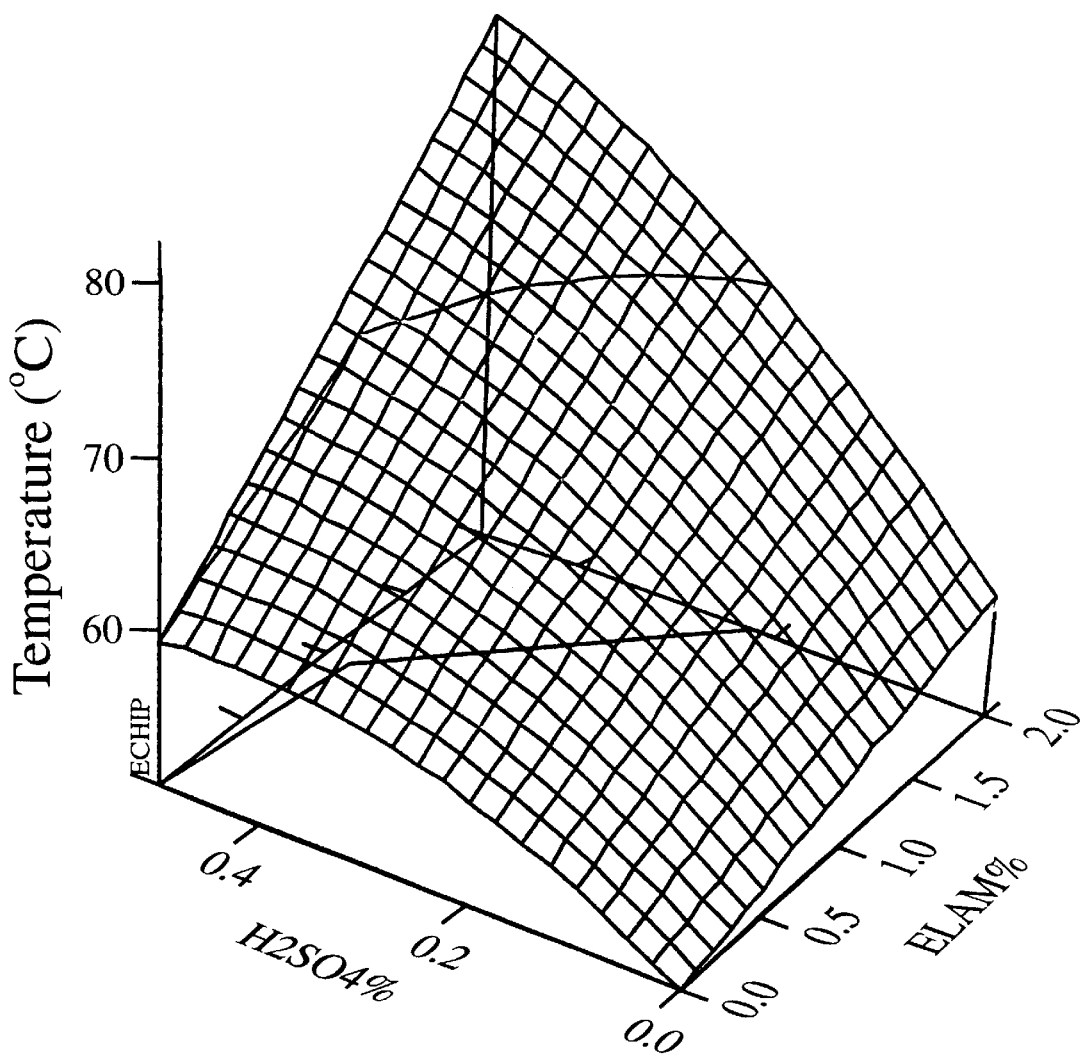
FIG. 4 is a three dimensional graph of effects for response '1/J"=2.2'.

The plot in FIG. 4 is a three dimensional response surface plot of the data summarized in Example C. As can be seen

TABLE 7

| | 135° C. | TEMPERATURES (DEG C.) AT TARGET SHRP PROPERTIES | | | | | |
|---|---|---|---|---|---|---|---|
| | Brookfield | UNAGED | RTFO | | PAV | | |
| TRIAL SAMPLE | Viscosity [Pa*s] | @ 1/J" = 1 kPa | @ 1/J" = 2.2 kPa | @ G" = 5000 kPa | @ STIFF. = 300 MPa | @ SLOPE = 0.300 | SHRP Δ [DEG C.] |
| 41A | 0.505 | 63.10 | 64.80 | 9.10 | −27.10 | −26.40 | 99.50 |
| 51A | 1.360 | 75.30 | 71.70 | 7.80 | −28.60 | −26.50 | 108.20 |
| GHR 043 | 6.400 | 61.40 | 57.50 | 6.10 | −29.00 | −28.30 | 95.80 |
| 52A | NO TEST | 65.90 | 69.20 | 6.50 | −28.60 | −27.70 | 103.60 |
| GHR 042 | NO TEST | 58.10 | 57.80 | 6.90 | −28.80 | −28.30 | 86.10 |

The increases in the Temperatures at which the 1/J"=1 values are achieved are quite marked in the acid treated samples: 13.9° C. for the unaged ELVALOY™ A compositions (51A vs GHR 043) and 7.8° C. for the unaged ELVALOY™ C samples (52A vs GHR 042), 14.2° C. for the RTFO ELVALOY™ A compositions and 11.4° C. for the RTFO ELVALOY™ C samples. The BBR stiffness values are essentially unaffected and the slight fall off in the "m" values are easily offset by the large gains in the SHRP Δ.

The combined effects of additional glycidyl methacrylate and increased molecular weight (generally inversely correlated to Melt Index) with respect to the current invention are illustrated by comparing Trials 51A and 52A with Trial 41A. Trial 41A has SHRP Δs 8.7° C. and 4.1° C. less than Trials 51A and 52A respectively, even though the levels of all additives are virtually identical for each trial. A logical conclusion which can be drawn from this data is that higher epoxy (glycidyl methacrylate) loadings and increased molecular weight improve SHRP test properties. While the practical ceiling for molecular weight and glycidyl methacrylate loadings has not been established, the above observations and data suggest that the present invention may extend those ceilings.

from this response surface plot the temperature at which 1/J" achieves 2.2 kPa (the SHRP minimum for the RTFO residue) increases as the per cent of Elvaloy AM increases (the "ELAM %" axis). Also the 1/J" temperature increases and then tends to level off as the amount of sulfuric acid increases (the "H$_2$SO$_4$%" axis). However, portions of the surface that represent various combinations of these two materials show a much steeper rate of increase of the 1/J"=2.2 kPa temperature. In addition these interior data points correspond to a higher 1/J"=2.2 kPa temperature than either of the component materials independently.

Figure 5:
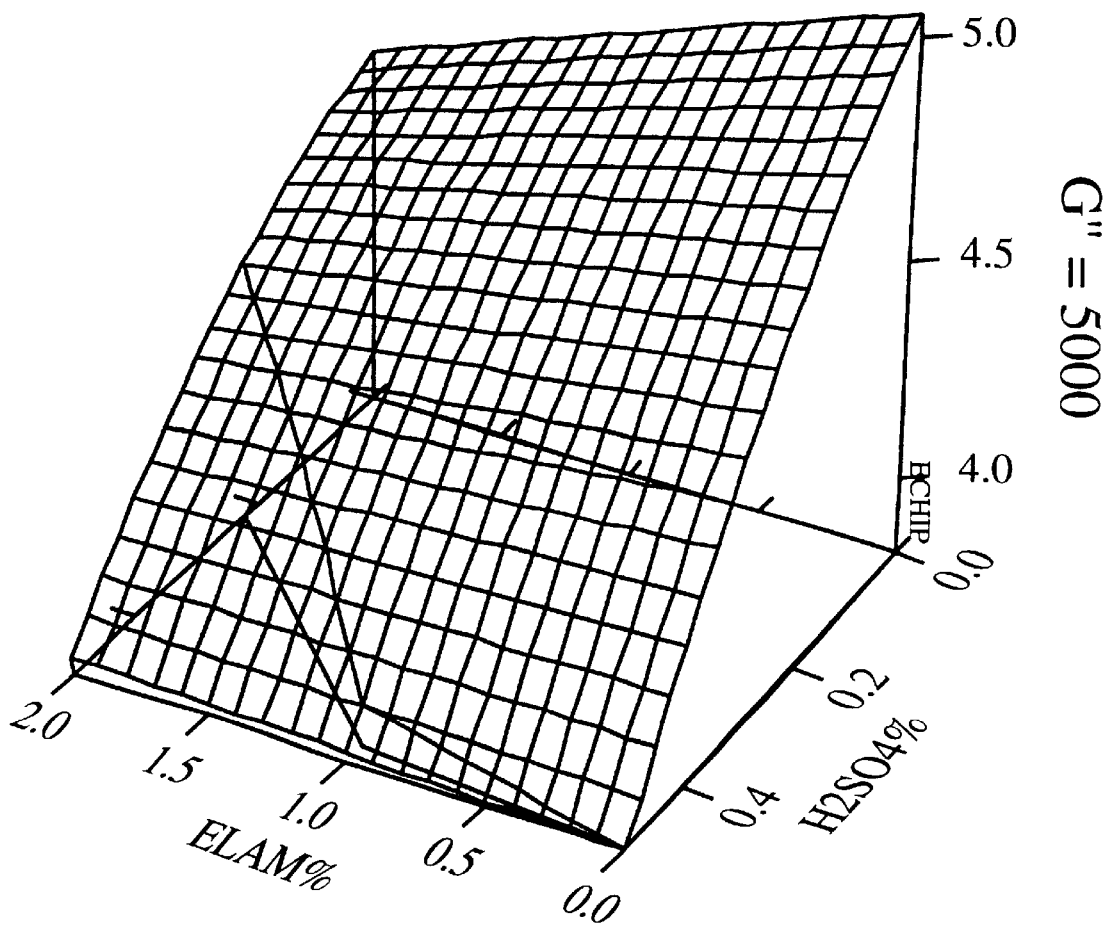
FIG. 5 is a three dimensional graph of effects for response 'G"=5000', the complex shear modulus.

The plot in FIG. 5 is a three dimensional response surface plot of the data summarized in Example C. As can be seen from this response surface plot the temperature at which the the G*×sin (δ), G", value of the PAV residue achieves 5000 kPa is essentially unchanged by the addition of Elvaloy and is decreased slightly by the increased level of H$_2$SO$_4$.

Figure 6:
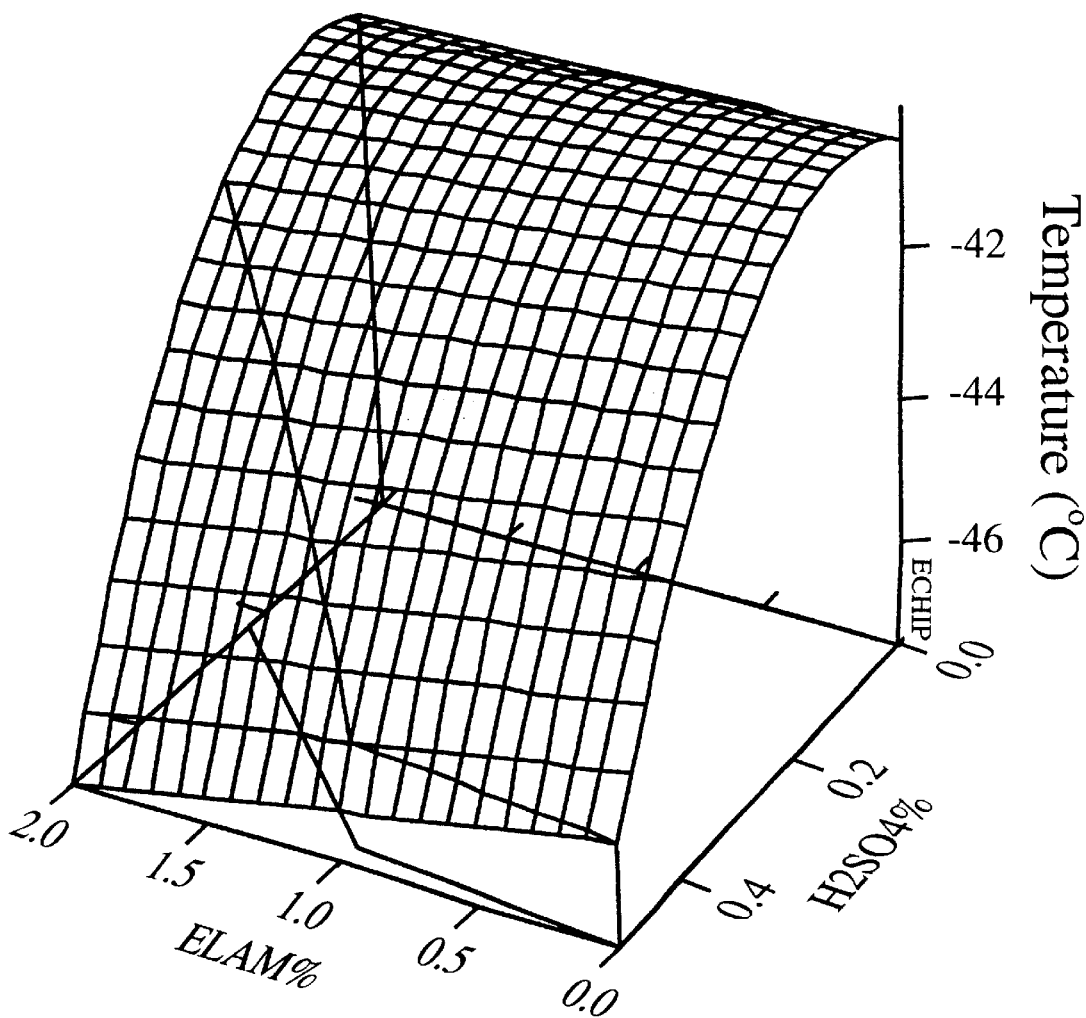
FIG. 6 is a three dimensional graph of effects for response 'LTCS @300', the low temperature creep stiffness in kilopascals.

The plot in FIG. 6 is a three dimensional response surface plot of the data summarized in Example C. As can be seen from this response surface plot the temperature at which the slope, at 60 seconds, of the Temp versus log Stiffness curve (the m-value) achieves 0.300 (the SHRP minimum for the PAV residue) decreases as the per cent of Elvaloy AM increases (the "ELAM %" axis). Also the m-value temperature decreases as a second order function as the amount of sulfuric acid increases (the "$H_2SO_4$%" axis). Also, it can be seen that the impact of the sulfuric acid is more pronounced than the impact of the Elvaloy. Typically, polymer additions have a deleterious impact or no effect on the m-value; the fact that Elvaloy alone does beneficially impact the m-value was unsuspected. The additional enhancement as a result of the acid addition was even more unsuspected and surprising.

Figure 7:
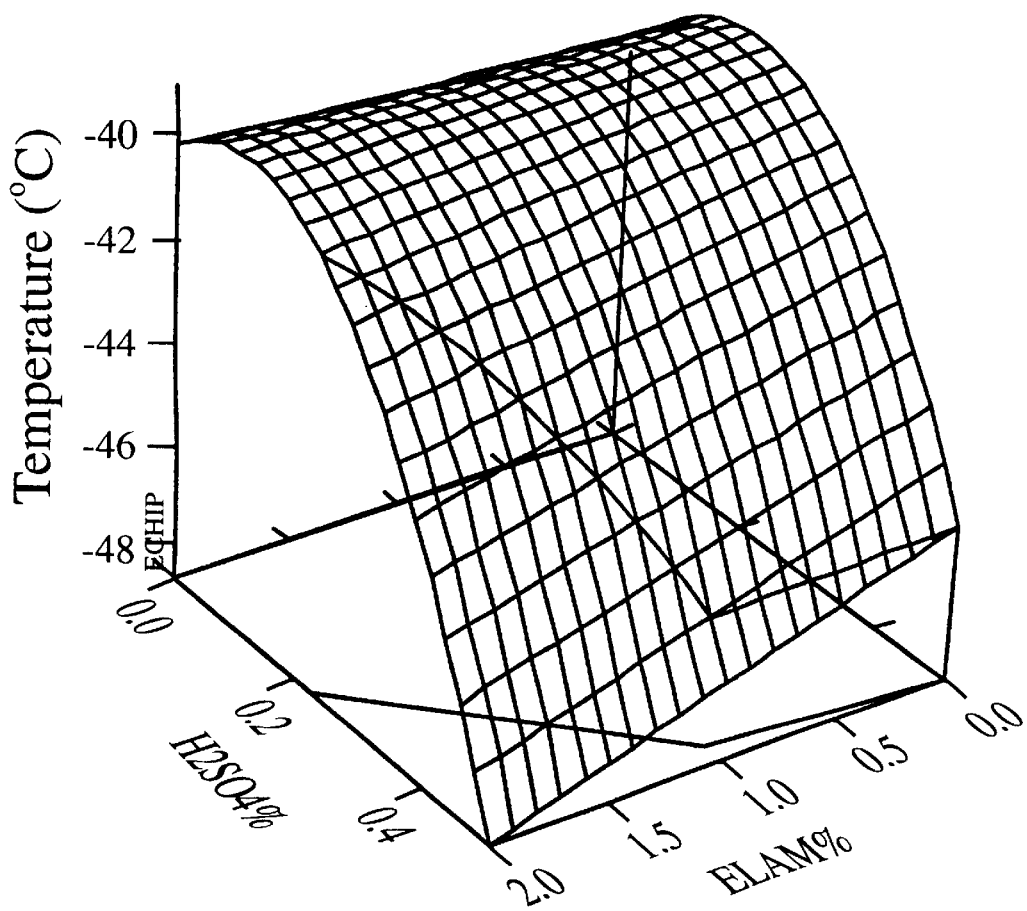
FIG. 7 is a three dimensional graph of effects for response 'm @0.300', the stress relaxation at low temperatures.

The plot in FIG. 7 is a three dimensional response surface plot of the data summarized in Example C. As can be seen from this response surface plot the temperature at which the low temperature creep stiffness (LTCS) achieves 300 MPa (the SHRP maximum for the PAV residue) decreases as the per cent of Elvaloy AM increases (the "ELAM %" axis). Also the LTCS temperature decreases as a second order function as the amount of sulfuric acid increases (the $H_2SO_4$% axis). Also, it can be seen that the impact of the sulfuric acid is more pronounced than the impact of the Elvaloy. Typically, polymer additions have little or no effect on the LTCS value; the fact that the Elvaloy alone does beneficially impact the LTCS was unsuspected. The additional enhancement as a result of the acid addition was even more unsuspected and surprising.

Example D

Example C illustrated the effect, in ELVALOY™ type polymers, of higher epoxide (glycidyl methacrylate) loadings in conjunction with higher molecular weights. The present example illustrates that the epoxide group can be part of the polymer backbone (in contrast to the pendent group provided by the glycidyl methacrylate) and that improved properties appear to be closely linked to a sufficient acid/epoxy ratio when molecular weight is held constant. Using low molecular weight polybutadiene resins available from Elf Atochem (Trade name: Poly BD Resin R45HT), with 0%, 3%, and 6% oxirane oxygen (i.e. epoxide oxygen), blends were made with a mixed refinery source, penetration graded 120/150 asphalt. These blends were prepared by mixing the following compositions at 165° C. and reacting them for about 20 hours:

TABLE 8

| Trial | % Resin in the modified blend | % Oxirane Oxygen in Resin | % $H_3PO_4$ | $H_3PO_4$/Oxirane Oxygen Ratio by wt. in the blend |
|---|---|---|---|---|
| 84A | 1.50 | 3.00 | — | — |
| 84B | 1.50 | 3.00 | 0.50 | 11.10 |
| 84C | 1.50 | 6.00 | — | — |
| 84D | 1.50 | 6.00 | 0.50 | 5.60 |
| 85B | 1.50 | 6.00 | 0.40 | 4.40 |
| 86A | 1.50 | — | 0.40 | — |
| 86B | 1.50 | — | — | — |
| 120/150, Neat | — | — | — | — |

Dynamic shear rheometer readings were taken on the unaged samples at 1 and 20 hours:

TABLE 9

| | 1/J" @ 58° C., 10 rad/s | | % Increase, Acid Treated Over control | | Temperature [Deg C.] @ 1/J" = 1.0 kPa | |
|---|---|---|---|---|---|---|
| Trial | @ 1 hr | @ 20 hr | @ 1 hr | @ 20 hr | @ 1 hr | @ 20 hr |
| 84A | 0.873 | 1.078 | NA | NA | NO TEST | NO TEST |
| 84B | 1.767 | GELLED | 102.00 | GELLED | NO TEST | NO TEST |
| 84C | 1.051 | 1.218 | NA | NA | 58.70 | 59.80 |
| 84D | 1.906 | 2.625 | 81.40 | 115.50 | NO TEST | NO TEST |
| 85B | 1.646 | 2.293 | 56.60 | 88.30 | 62.20 | 64.50 |
| 86A | 1.152 | 1.355 | 26.30 | 33.90 | 59.40 | 60.70 |
| 86B | 0.912 | 1.012 | NA | NA | 57.40 | 58.30 |
| 120/150, Neat | 1.071 | NA | NA | NA | 58.70 | NA |

The effect of the non-epoxidized polybutadiene, Trial 86B, is essentially that of a plasticizing oil; that is, the 1/J" value is less than that for the neat 120/150 asphalt. When phosphoric acid is introduced, as in Trial 86A, there is only a 33.9% improvement in the 1/J" value at 20 hours. When the acid is introduced to asphalt/resin solutions where the resin contains epoxy groups, as in Trials 84B, 84D, and 85B, the increases in 1/J" at one hour, compared to the same solutions without acid (Trials 84A, 84C, and 84C, respectively), improve from 56.6% to 81.4% to 102.0% as the $H_3PO_4$/Oxirane Oxygen Ratio increases from 4.4 to 5.6 to 11.1.

The importance of having sufficient acid, as measured by the $H_3PO_4$/Oxirane Oxygen Ratio, is illustrated by comparing the results of Trial 84B with Trial 84D. The resin with only 3% oxirane oxygen (Trial 84B) shows a greater initial boost than the resin with 6% oxirane oxygen (Trial 84D) when the $H_3PO_4$ loading was kept at 0.5% by weight of the final composition. Trials 84D and 85B exhibit a comparison between identical resin blends but with slightly differing acid additions. Trial 84D contains 0.1% more FhPO4 than does Trial 85B; and more importantly the $H_3PO_4$/oxirane oxygen ratio of 84D is 27.3% {(5.6–4.4)/4.4 *100%} greater than the same ratio for Trial 85B. When the % increase in 1/J" of Trial 84D over the no acid control (Trial 84C) is compared to the % increase in 1/J" of Trial 85B over the no acid control; one finds that Trial 84D has a 1/J" increase that is 27.2% greater than the increase for Trial 85B (115.5%–88.3%).

In the ELVALOY™ acid system, less sensitivity to the acid/epoxy ratio is observed. Perhaps due to the saturated backbone of this family of polymers, less of the acid is consumed in nonproductive chemistry than with the unsaturated backbone of the poly butadiene resins.

Example E

In addition to preparing the asphalt blends of the present invention according to the method of Example B, preparation of other asphalt blends according to the present invention can be successfully carried out by pre-adding the acid to the asphalt at temperatures in excess of approximately 155° C., agitating with low shear mixing until all foaming ceases, and then adding the required polymer. If an epoxide bearing polymer, such as ELVALOY™ AM, is added, at temperatures lower than about 155° C., to an asphalt pretreated with acid; the rate at which the polymer reacts with the acid may exceed the rate at which the polymer can be melted and dispersed into the asphalt. This will result in the polymer at the surface of the polymer pellet crosslinking with itself, becoming insoluble in the asphalt and consequently not permitting the remaining unreacted polymer in the pellet from dispersing into the asphalt.

Aside from this processing disadvantage to pretreating the asphalt, there is virtually no difference in the properties of the final product. To illustrate this, two identical blends, 76A and 76B, were produced with 73.38% of a domestic crude source AC-20, a viscosity graded asphalt 24.46% of a domestic crude source asphalt flux 1.59% ELVALOY™ AM, and 0.57% of a 85.9% (ortho) phosphoric acid In the following manner:

76A: A 75/25 blend of AC-20/flux was heated to about 160° C., with steady, low shear agitation, whereupon it was treated, with the required $H_3PO_4$ and reacted until all foaming ceased. The temperature was then increased to about 170° C. and the ELVALOY™ AM was introduced. Steady low shear agitation was continued until the polymer was dispersed. The sample was then put in a 170° C. oven to continue reaction.

76B: A 75/25 blend of AC-20/ flux was heated to about 170° C., with steady, low shear agitation, and the ELVALOY™ AM was introduced. After an hour at this temperature, the polymer was fully dispersed and the required $H_3PO_4$ was introduced and reacted until all foaming ceased. The sample was then put in a 170° C. oven to continue reaction. The two runs compare as follows:

Example F

A direct comparison between the acid initiated and conventional ELVALOY™ blend was conducted using materials similar to those in Example E a domestic crude source AC-20, a viscosity graded asphalt, a domestic crude source asphalt flux, ELVALOY™ AM, and 85.9% (ortho) phosphoric acid.

These components were used to blend Trials 74A and 74B in the following manner:

Trial 74A: A 79/21 blend of AC-20/flux was heated to 180° C. and 1.6% ELVALOY™ AM was added with steady, low shear agitation until it was fully dispersed. The sample was then put into a 180° C. oven, with no agitation, for continued reaction.

74B: A 79/21 blend of AC-20/flux was heated to 160° C. and 1.6% ELVALOY™ AM was added with steady, low shear agitation until it was fully dispersed. Maintaining that temperature, 0.58% $H_3PO_4$ (85.9%) was then introduced. Agitation was continued until all foaming ceased whereupon the sample was put into a 160° C. oven, with no agitation, for continued reaction.

A comparison of the two trials is shown below:

TABLE 11

| Trial Sample | 64° C. G*/SIN(δ)[1/J" in kPa] at 10 rad/s at | | | | |
|---|---|---|---|---|---|
| | 1 HOUR | 16 HOUR | 40 HOUR | 48 HOUR | 120 HOUR |
| 74A | 0.399 | 0.862 | 0.912 | 0.929 | 1.107 |
| 74B | 1.749 | 1.725 | 1.765 | 1.669 | 1.819 |
| 74A/74B | 4.40 | 2.00 | 1.90 | 1.80 | 1.60 |

The acid initiated reaction (74B), it can be seen, ultimately reaches a 1/J"=approximately 1.6 times that of the conventional blend (74A), as per the claim of the present

TABLE 10

| | TEMPERATURES [DEG C.] AT TARGET SHRP PROPERTIES | | | | | SLOPE OF LOG 1/J" | |
|---|---|---|---|---|---|---|---|
| | UNAGED | RTFO | PAV | | | VS TEMP | |
| TRIAL SAMPLE | @ 1/J" = 1 kPa | @ 1/J" = 2.2 kPa | @ G" = 5000 kPa | @ STIFF. = 300 MPa | @ SLOPE = 0.300 | LINE [log (kPa)/° C.] | SHRP Δ [DEG C.] |
| 76A | 72.50 | 71.20 | 18.20 | −18.6 | −17.6 | −0.039 | 98.80 |
| 76B | 72.30 | 71.50 | 18.30 | −18.1 | −17.3 | −0.040 | 98.80 |

There is, as can be seen from the data, virtually no difference between the trials with pre- or post-addition of the acid with respect to the final properties.

With respect to operational concerns, there may be advantages with either procedure. Using the post-addition method, the material can be produced at lower temperatures without the possibility of reacting the polymer before it is totally dispersed—this is desirable with respect to reduced energy costs and reduced stack emissions from the production site. If, however, it is advantageous, for some reason, to conduct the reaction at an elevated temperature—at a refinery, for example, with time constraints and a high temperature asphalt stream—then pre-treatment of the asphalt with acid may be desirable.

invention. By the end of one hour and thereafter, 74B had achieved at least 90% of its final (120 hour) 1/J". 74A did not achieve this extent of reaction until about 60 hours. Further, an examination of the log 1/J" vs temperature lines indicates that after each time increment, the acid initiated sample exhibited less temperature dependency than the heat initiated one:

TABLE 12

| Trial Sample | SLOP OF LOG (1/J") VS TEMP LINE AT | | | | |
|---|---|---|---|---|---|
| | 1 HOUR | 16 HOUR | 40 HOUR | 48 HOUR | 120 HOUR |
| 74A | −0.052 | −0.052 | −0.049 | −0.048 | −0.046 |
| 74B | −0.043 | −0.048 | −0.045 | −0.044 | −0.042 |

By adding the above described polymers to asphalt in the presence of acid, according to the present invention, sufficient processing oils can be added to enable attaining the very lowest SHRP performance grades, while also minimizing the required amounts of polymer, which is generally the most expensive component.

EXAMPLE G

To further show the usefulness of the present invention over the conventional process for producing ELVALOY™ modified asphalt and to also demonstrate the efficacy of using acid blends the following experimental runs were compared. All blends were produced using a mixed refinery source blend of asphalts with a penetration of 105 dmm.

TABLE 13

| Trial # | % ELVALOY™ AM | % H$_3$PO$_4$ | % H$_2$SO$_4$ | Blend & Storage Temp | Temp @ 1/J" = 1 kPa at 1 hr | Temp @ 1/J" = 1 kPa at 18 hr | Temp @ 1/J" = 1 kPa at 25 hr | Temp @ 1/J" = 1 kPa at 42 hr |
|---|---|---|---|---|---|---|---|---|
| 91A | 2.00 | 0.00 | 0.00 | 190° C. | 62.7° C. | 65.5° C. | 66° C. | 66° C. |
| 91B | 1.60 | 0.50 | 0.00 | 160° C. | 69.5° C. | 68.4° C. | 69.1° C. | 69.3° C. |
| 91C | 1.60 | 0.25 | 0.15 | 160° C. | 70.4° C. | 70.2° C. | 69.4° C. | 68.6° C. |

Even though Trial 91A contained 25% more polymer than did Trials 91B and 91C and was maintained at a temperature 30° C. hotter than Trials 91B and 91C, the results show that the blends produced in accordance with this invention have achieved greater 1/J" stiffness values over similar time periods. If 1/J" values as high as those obtained in Trials 91B and 91C are not required, the level of polymer addition could be reduced even more thus adding to the economic benefit of this invention.

The present invention provides several advantages to the formulator who is using epoxide functionalized polymer additives to improve the properties of asphalt. In particular the present invention provides advantages to the formulator who is employing ELVALOY™ as the epoxide functionalized polymer to modify asphalt. We have discovered that through the use of low levels of acid in conjunction with ELVALOY™ that both the time and the temperature required to complete the reaction of the ELVALOY™ with the asphalt are substantially reduced. Additionally, we have discovered that the amount of ELVALOY™ which must be added to any particular asphalt to achieve a desired set of finished product characteristics can be reduced when the finished product is made following this invention. These improvements to the finished product are all achieved with no loss of performance properties of the finished asphalt blend as measured using SHRP test methods or other currently utilized test procedures.

The particular role played by the acid in the formulation of the PMA compositions according to the present invention is not completely understood. However, it is not necessary to understand the mechanism of the interaction of the various components in forming the present novel PMA compositions of this invention in order to practice this invention.

According to the present invention, other polymers known as desirable asphalt modifiers may also be added to the asphalt, along with the acid and the polymers as described above. For example, styrene/conjugated diene block copolymers derived from styrene and a conjugated-diene, such as butadiene, may also be added. Such copolymers are available under the tradenames KRATON™, from Shell Chemical Co., EUROPRENE SOL™, from Enichem, and FINAPRENE™, from Fina Chemical Co. Procedures for preparing these copolymers are also available from U.S. Pat. No. 3,281,383, issued Oct. 25, 1966 to R. P. Zelinski, et al., and U.S. Pat. No. 3,639,521, issued Feb. 1, 1972 to J. L. Hsieh. Additionally, ethylene copolymerized with esters such as vinyl acetate, methyl acrylate, n-butyl acrylate, ethyl acrylate or the like may be blended with the polymers described in this invention to achieve suitable results. It is also anticipated that polyethylene and the products of this invention may be blended to produce suitable results. It is also contemplated that other polymers known in the industry as asphalt modifiers may also be added to the asphalt compositions according to the present invention.

What is claimed is:
1. A polymer-modified asphalt composition comprising:
   (A) an asphalt;
   (B) a stiffness-enhancing amount of a copolymer, wherein said copolymer comprises available epoxy groups; and
   (C) an amount of an acid effective for promoting chemical bonding between the asphalt and the available epoxy groups of the copolymer.
2. A polymer-modified asphalt composition comprising;
   (A) an asphalt;
   (B) a stiffness-enhancing amount of a polymer component selected from:
      (i) a copolymer containing available epoxy groups; and
      (ii) a curable blend comprising 1–99 weight percent of said copolymer, based upon the blend, and 99–1 percent by weight, based upon the blend, of an organic thermosetting resin, wherein the thermosetting resin is functionally compatible with the copolymer, and wherein the thermosetting resin is selected from the group consisting of phenolic resins, epoxy resins and melamine formaldehyde resins; and
   (C) an amount of an acid effective for promoting chemical bonding between the asphalt and the available epoxy groups of the copolymer.
3. A polymer-modified asphalt product formed by the process of:
   (A) forming a heated reaction mixture of:
      (i) an asphalt; and
      (ii) a stiffness-enhancing amount of a copolymer, wherein said copolymer comprises available epoxy groups; and
   (B) subsequently adding to said heated reaction mixture an amount of an acid effective for promoting chemical bonding between the asphalt and the available epoxy groups of the copolymer.
4. A composition according to claim 1 wherein said copolymer is a vinyl copolymer derived from at least two monomers, one of which is ethylene.

5. A composition according to claim 1 wherein said copolymer is an ethylene-carbon monoxide terpolymer containing at least one monomer chosen from the group consisting of:
(A) an ethylenically unsaturated monomer of 4–21 carbon atoms containing an epoxy group;
(B) an unsaturated mono- or dicarboxylic acid-functionalized monomer of 3–20 carbon atoms;
(C) an ester of ad unsaturated mono- or dicarboxylic acid-functionalized monomer; and
(D) vinyl esters of a saturated carboxylic acid where the acid group has 1–18 carbon atoms.

6. A composition according to claim 1, wherein the acid is a proton donor.

7. A composition according to claim 1, wherein the acid is selected from sulfuric acid, phosphoric acid, hydrochloric acid, glacial acetic acid and nitric acid.

8. A composition according to claim 1, wherein the acid is sulfuric acid in an amount of about 0.02 to 3.0 weight percent, based on the composition.

9. A composition according to claim 1, wherein the acid is phosphoric acid in an amount of about 0.05 to 5.0 weight percent, based on the composition.

10. A composition according to claim 6, wherein the composition further comprises about 0.5 to about 20 weight percent of a processing oil.

11. A product formed by the process of claim 3 wherein said heated reaction mixture is at a temperature from about 135° C. to about 185° C.

12. A product formed by the process of claim 3 wherein said amount of acid is in the range of about 0.05% to 5% weight percent, based upon the product.

13. An aggregate composition comprising from about 90 to about 99 weight percent of an aggregate with from about 1 to about 10 weight percent of a composition according to claim 6.

14. A process for preparing a polymer-modified asphalt composition of claim 1 comprising:
(A) forming a reaction mixture comprising:
  (i) an asphalt; and
  (ii) a stiffness-enhancing amount of a copolymer wherein said copolymer comprises available epoxy groups; and
  (iii) an amount of an acid effective for promoting chemical bonding between the asphalt and the available epoxy groups of the copolymer; and
(B) mixing said reaction mixture under conditions sufficient for promoting chemical bonding between the asphalt and the available epoxy groups of the copolymer.

15. A process for preparing a polymer-modified asphalt composition of claim 2 comprising:
(A) forming a reaction mixture comprising:
  (i) an asphalt;
  (ii) a stiffness-enhancing amount of a polymer component selected from:
    (a) a copolymer containing available epoxy groups; and
    (b) a curable blend comprising 1–99 weight percent of said copolymer, based upon the blend, and 99–1 percent by weight, based upon the blend, of an organic thermosetting resin, wherein the thermosetting resin is functionally compatible with the copolymer, and wherein the thermosetting resin is selected from the group consisting of phenolic resins, epoxy resins and melane formaldehyde resins: and
  (iii) an amount of an acid effective for promoting chemical bonding between the asphalt and the available epoxy groups of the copolymer; and
(B) mixing said reaction mixture under conditions sufficient for promoting chemical bonding between the asphalt and the available epoxy groups of the copolymer.

16. A process for preparing a composition according to claim 15, wherein the copolymer is first blended with the asphalt and thereafter the acid is added to the blend under conditions effective to promote chemical bonding between the asphalt and the available epoxy groups of the copolymer.

17. A process for preparing a composition according to claim 15, wherein the asphalt is first blended with the acid and thereafter the copolymer is added under conditions effective to promote chemical bonding between the asphalt and the available epoxy groups of the copolymer.

18. A process for preparing a composition according to claim 15, wherein the process includes a heating step to a temperature of no more than about 180° C. and wherein the process is completed in about 24 hours.

19. A process for preparing a composition according to claim 15, wherein the acid is a proton donor.

20. A process for preparing a composition according to claim 15, wherein the acid is selected from sulfuric acid, phosphoric acid, nitric acid, glacial acetic and hydrochloric acid.

21. A process for preparing a composition according to claim 15, wherein the acid is sulfuric acid in an amount of about 0.02–3.0 weight percent, based upon the composition.

22. A process for preparing a composition according to claim 15, wherein the acid is phosphoric acid in an amount of about 0.05 to 5.0 weight percent, based upon the composition.

23. A process for preparing a composition according to claim 15, wherein the reaction mixture further comprises about 0.5 to about 20 weight percent, based upon the composition, of a processing oil.

24. A polymer modified asphalt composition comprising:
(A) an asphalt;
(B) a stiffness-enhancing amount of a copolymer, wherein said copolymer comprises available epoxy groups;
(C) an amount of an acid effective for promoting chemical bonding between the asphalt and the available epoxy groups of the copolymer; and
(D) an effective amount of a processing oil.

25. An asphalt emulsion comprising:
50 to 80 weight percent, based upon the asphalt emulsion, of the asphalt composition of claim 1,
0.05 to 5.0 weight percent, based upon the asphalt emulsion, of a suitable asphalt emulsifying surfactant, and
water.

26. An asphalt emulsion comprising:
50 to 80 weight percent, based upon the asphalt emulsion, of the asphalt composition of claim 2,
0.05 to 5.0 weight percent, based upon the asphalt emulsion, of a suitable asphalt emulsifying surfactant, and
water.

27. A cutback asphalt comprising:
40 to 98 volume percent, based on the cutback asphalt, of the asphalt composition of claim 2, and
2 to 60 volume percent, based on the cutback asphalt, of a petroleum solvent having a flash point as determined by ASTM D 56 or D 92, whichever is appropriate to the solvent, of between 15° C. and 250° C.

28. A composition according to claim 1, wherein the copolymer has a melt index of about 1.2 g/sec at 190° C. and is comprised of approximately 67 mole-% ethylene, 28 mole-% n-butyl acrylate, and 5 mole-% glycidyl methacrylate.

29. A composition according to claim 2, when the copolymer has a melt index of about 1.2 g/sec at 190° C. and is comprised of approximately 67 mole-% ethylene, 28 mole-% n-butyl acrylate, and 5 mole-% glycidyl methacrylate.

30. A composition according to claim 2, wherein the acid is a proton donor.

31. A composition according to claim 2, wherein the acid is selected from sulfuric acid, phosphoric acid, hydrochloric acid, glacial acetic acid and nitric acid.

32. A composition according to claim 2, wherein the acid is phosphoric acid in an amount of about 0.05 to 5.0 weight percent based on the weight of the composition.

33. A product formed by the process of claim 3, wherein the coplymer has a melt index of about 1.2 g/sec at 190° C. and is comprised of approximately 67 mole-% ethylene, 28 mole-% n-butyl acrylate, and 5 mole-% glycidyl methacrylate.

34. A product formed by the process of claim 3, wherein the acid is a proton donor.

35. A product formed by the process of claim 3, wherein the acid is selected from sulfuric acid, phosphoric acid, hydrochloric acid, glacial acetic acid and nitric acid.

36. A product formed by the process of claim 3, wherein the acid is phosphoric acid in an amount of about 0.05 to 5.0 weight percent based on the composition.

37. A composition according to claim 5, wherein the copolymer has a melt index of about 1.2 g/sec at 190° C. and is comprised of approximately 67 mole-% ethylene, 28 mole-% n-butyl acrylate, and 5 mole-% glycidyl methacrylate.

38. A composition according to claim 5, further comprising a processing oil.

39. A composition according to claim 5, wherein the acid is a proton donor.

40. A composition according to claim 5, wherein the acid is selected from sulfuric acid, phosphoric acid, hydrochloric acid, glacial acetic acid and nitric acid.

41. A composition according to claim 5, wherein the acid is phosphoric acid in an amount of about 0.05 to 5.0 weight percent, based on the weight of the composition.

42. An aggregate composition comprising from about 90 to about 99 weight percent of an aggregate with from about 1 to about 10 weight percent of a composition according to claim 1.

\* \* \* \* \*